Aug. 27, 1929. J. B. ARMITAGE 1,726,377
TRANSMISSION FOR MACHINE TOOL SUPPORTS
Filed May 24, 1928
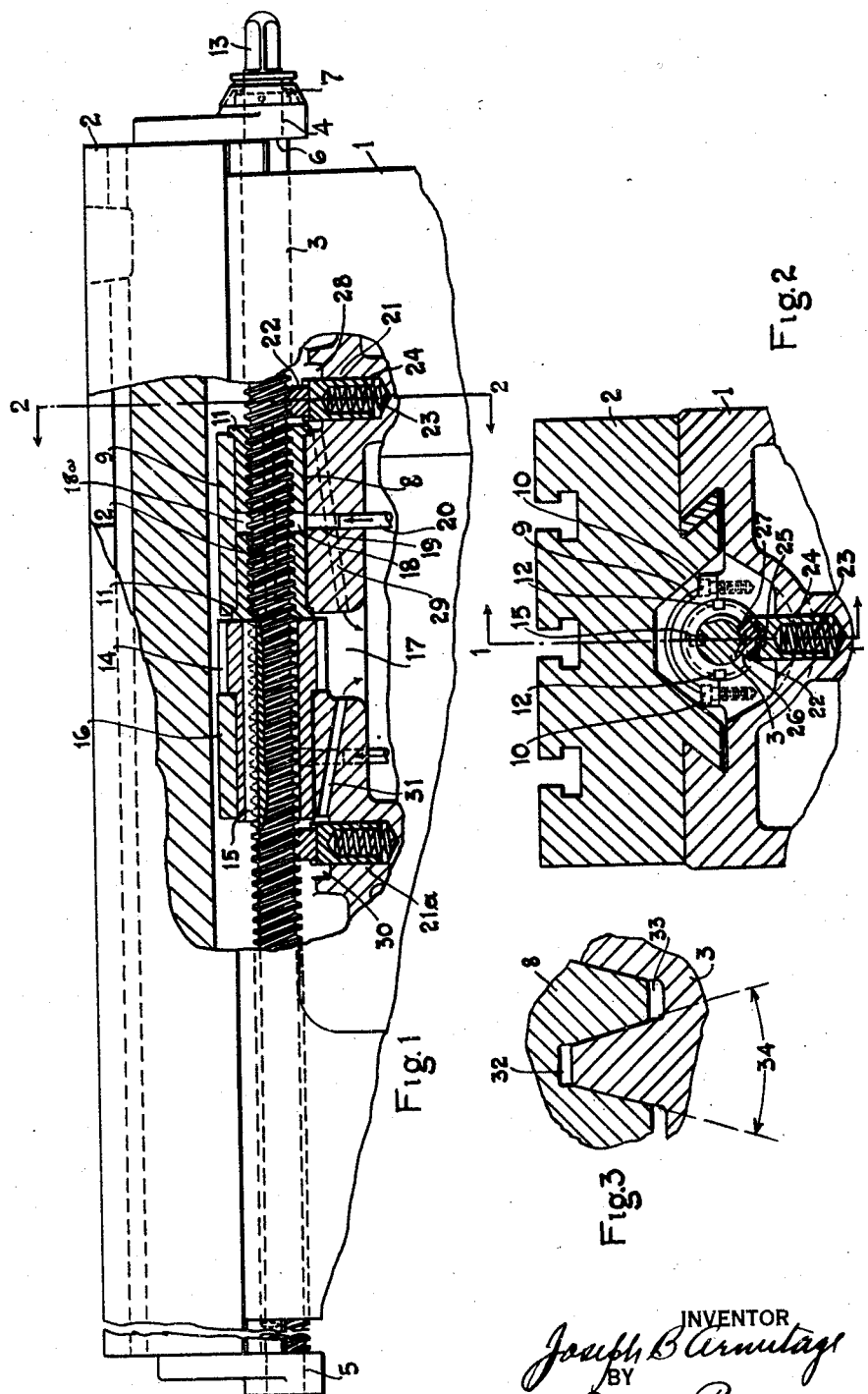

Patented Aug. 27, 1929.

1,726,377

UNITED STATES PATENT OFFICE.

JOSEPH B. ARMITAGE, OF MILWAUKEE, WISCONSIN, ASSIGNOR TO KEARNEY & TRECKER CORPORATION, OF WEST ALLIS, WISCONSIN.

TRANSMISSION FOR MACHINE-TOOL SUPPORTS.

Application filed May 24, 1928. Serial No. 280,156.

This invention relates to drive mechanism for machine tool supports and more particularly for screw actuated reciprocatory supports.

Screw driven supports ordinarily have, or soon acquire through wear of the screw and nut, a certain amount of lost motion in the direction of support movement. Such lost motion may vary in different positions of the screw and nut either because the screw is originally imperfect or because it wears unequally in different portions or for a variety of reasons. In any case, any lost motion is very objectionable because it permits the support to have a freedom of movement likely to cause chatter under certain conditions, and also because of inaccurate work produced when the accuracy depends upon the uniform advance of the support per revolution of the screw, and also for other reasons.

A main purpose of the invention is to provide means automtically preventing lost motion between the screw and nut of a machine tool support.

A further purpose is to provide in combination therewith improved lubricating means, whereby tendency to establish lost motion will be reduced.

For various reasons, particularly to avoid high rotative speeds of certain portions of the transmmission, support transmission screws are often made with threads having relative great pitch or lead, whereby the thread angle becomes relatively large, to the extent that the screw and nut are not self locking, and pressure against the support may cause the support to drive the screw.

This is very objectionable particularly in that under certain conditions such action will cause clutches to disengage in the support power transmission and permit the support and screw to run ahead of the power transmission whereby control of the support is lost and damage may result to the work, tool or machine.

Another purpose of the invention is to provide improved means preventing the above described action, and also such means in combination with the previously mentioned lost motion preventing means.

Another purpose is generally to simplify and improve the design, construction and operation of machine tool support transmissions and lubricating means therefor, and still other objects will be apparent from this specification.

The invention consists in the novel features of the construction, arrangement and combination of parts herein illustrated, described and claimed, and in such modifications of the specific structure illustrated and described as may be equivalent to the structure claimed.

In the drawings, like reference characters have been used for the same parts throughout.

Fig. 1 is a front elevation, partly in section of a portion of a machine tool in which the invention is incorporated, the sectional portion being taken along line 1—1 of Fig. 2.

Fig. 2 is a sectional elevation of a portion of the same machine taken along line 2—2 of Fig. 1.

Fig. 3 is an enlarged section of a portion of a screw and nut shown in Figs. 1 and 2.

A support or saddle 1 guides a table or work support 2 for reciprocatory movement. The construction of the guide or slide for relative movement of the supports may be of any suitable form and since a variety of such are well known, will not be described here.

A feed screw 3 is journaled for movement with table 2 in bracket bearings 4—5 fixed with the table but is prevented from axial movement relative to the table by the means of an annular shoulder 6 and a collar 7, or any suitable manner. A nut 8 threadedly engages screw 3 and is fixed against movement relative to saddle 1, being clamped by a removable cap 9 having screws 10 and having annular shoulders or abutments 11 and keys 12.

Screw 3 may be rotated by a hand crank (not shown) applied to the squared end 13 thereof, or may be rotated through a gear 14. Gear 14 is keyed with screw 3 by the means of a key 15 for which a suitable keyway is provided, and is prevented from axial movement relative to saddle 1 and retained by a removable cap 16 similar to cap 9 previously described. The screw is loosely fitted for relative axial movement within the bore of gear 14. A power transmission (not shown) may be of any suitable type to engage and drive gear 14 through a saddle opening or channel 17.

When screw 3 is rotated by either means described, the screw will be moved axially according to the direction of rotation and move the table relative to the saddle.

Lubricant is supplied directly to the threads of screw 3 within nut 8 through a channel 18 in the nut, which communicates with a channel 19 in saddle 1, which in turn is fed from any suitable source such as a pipe or channel 20, lubricant preferably being continuously supplied.

A plurality of devices generally denoted by the numerals 21 and 21$^a$ are similar in construction and therefore only the device 21 will be described in detail. Device 21 includes a member 22 which engages closely with the threads of screw 3 over a portion of screw circumference and length, in a manner corresponding to a portion of a close fitting nut. Member 22 is yieldably and continuously pressed against screw 3 by the means of a spring 23 and a plunger 24 having a slot 25 within which a portion of the member 22 is fitted to permit relative sliding in the direction of the screw axis, whereby the member may accommodate itself to the screw threads. The sides of the member 22 at 26 and 27 are formed to scrape off from the threads of the screw substantially all lubricating fluid which might otherwise travel along the screw to the right in Fig. 1. Such fluid will flow downwardly to be received in a depression or well indicated at 28 from which it is returned to the opening or channel 17 of the saddle through a channel 29. Such channel preferably leading to reservoir or storage (not shown) from which fluid may be forced again to the channel 20 by any suitable pumping means of which several are well known.

The device 21$^a$ similarly scrapes from the screw any lubricant tending to flow along the screw to the left in Fig. 1 and similarly returns it to the channel 17 from a depression or well 30 through a channel 31.

By the means described the screw and nut may be continuously flooded with lubricant at points where it is needed to prevent wear therebetween, and surplus fluid may be prevented from overrunning the exterior of the machine and returned to be used again.

The spring pressure of the devices 21 and 21$^a$ is sufficient to overcome the weight or other resistance of screw 3 and to press the screw continuously and firmly against the upper portion of nut 8. The thread sides of the screw and nut are angularly disposed as indicated in Fig. 3 and clearance is provided both at the top and bottom of the threads as indicated at 32 and 33 whereby the spring pressure is sufficient at all times to seat the angular faces together. The angle 34 of the thread sides may vary considerably but should be large enough that the pressure does not cause the threads to stick or bind, and small enough that an axial screw pressure does not tend to disengage the threads against the pressure of the devices 21 and 21$^a$. If so constructed the screw will move minutely relative to the nut and transverse to the screw axis, being pressed farther into mesh with the nut threads as the parts wear and moving in and out to compensate for smaller or larger portions of screw thread diameter whereby to maintain at all times a close fitting relationship without possibility of lost motion or axial movement between the opposed threads. The pressure of devices 21—21$^a$ and the construction described also provides a considerable friction load, which constitutes a brake tending to prevent any objectionable overrunning of the screw such as previously mentioned.

Since the screw and nut are continuously pressed relatively in one direction, only half the nut is operative. The nut therefore is made reversible whereby after a certain degree of wear takes place on the upper half of the nut in Fig. 2, the cap 9 may be removed or loosened and the nut rotated a half revolution, after removing keys 12, following which the keys are replaced and the nut now presents a new surface to the screw. A second lubricant channel 18$^a$, Fig. 1 is provided to function in place of channel 18 when the nut is reversed.

What is claimed is:

1. In a machine tool having relatively reciprocable supports, the combination of transmission mechanism for relative movement between said supports including a screw member axially fixed with one of said supports, a nut member relatively rotatably engaging said screw and axially fixed with the other support, and means yieldably bodily urging one of said members transversely to the axis thereof whereby to prevent axial lost motion between the members.

2. In a machine tool having relatively reciprocable supports, the combination of transmission mechanism for relative movement therebetween including a screw member and a nut member relatively rotatably engaging said screw, said members having complementary threads the sides of which are angularly disposed with reference to a plane transverse to the axis of said members, said threads having clearance space both at the top and at the bottom, and means yieldably bodily urging one of said members transversely to the axis thereof whereby to take up axial lost motion between the members.

3. In a machine tool having relatively reciprocable supports the combination of a screw rotatably fixed against axial movement relative to one of said supports, a nut engaging said screw and fixed against axial movement relative to the other support, a plurality of thrust members respectively spaced at opposite ends of said nut, and means yieldably thrusting each of said members in the same direction against said screw and transverse to the axis thereof.

4. In a machine tool having relatively reciprocable supports the combination of a screw rotatably fixed against axial movement relative to one of said supports, a nut fixed against axial movement relative to the other support, said screw and nut having complementary engaged threads the sides of which are angular relative to the screw axis, a member movable transversely to the axis of said screw to engage therewith, and means yieldably continuously urging said member in the direction stated.

5. In a machine tool having relatively reciprocable supports, the combination of a screw rotatably fixed against axial movement relative to one of said supports, a nut fixed against axial movement relative to the other support, a member movable transversely to the axis of said screw to engage therewith, and means continuously yieldably urging said member in the direction stated.

JOSEPH B. ARMITAGE.